US008162757B2

(12) United States Patent
Sohl et al.

(10) Patent No.: US 8,162,757 B2

(45) Date of Patent: Apr. 24, 2012

(54) MULTIPLAYER PLATFORM FOR MOBILE APPLICATIONS

(75) Inventors: Barry Sohl, Huntington Beach, CA (US); Cory Radcliff, Burbank, CA (US); Brooke Elizabeth Olson, Culver City, CA (US)

(73) Assignee: Electronic Arts Inc., Redwood City, CA (US)

( * ) Notice: Subject to any disclaimer, the term of this patent is extended or adjusted under 35 U.S.C. 154(b) by 1186 days.

(21) Appl. No.: 11/875,692

(22) Filed: Oct. 19, 2007

(65) Prior Publication Data

US 2008/0220875 A1 Sep. 11, 2008

Related U.S. Application Data

(60) Provisional application No. 60/893,618, filed on Mar. 7, 2007.

(51) Int. Cl.
*A63F 13/12* (2006.01)

(52) U.S. Cl. ................ 463/42; 463/24; 463/29; 463/39; 381/311; 370/913; 340/5.61; 340/5.64; 455/41.2; 455/151.2; 455/500; 455/554.2

(58) Field of Classification Search .................... 463/16, 463/20, 24, 29, 36–37, 39–40, 46–47, 42; 273/138.1, 138.2, 139, 141 A, 141 R, 142 A, 273/142 B, 142 C, 142 H, 142 HA, 142 J, 273/142 R, 143 A, 143 R, 148 B, 309, 460; 381/311, 315; 370/913; 340/5.61, 5.64, 340/825.69, 825.72; 345/2.3; 455/41.2, 455/106, 151.2, 226.2, 300, 311, 347–349, 455/426.1–426.2, 500, 512–513, 526, 554.2, 455/555, 575.5; 711/102–104, 115, 163; 714/47.1–47.3, 48–49, 735–737; 902/23

See application file for complete search history.

(56) References Cited

U.S. PATENT DOCUMENTS

| | | | | |
|---|---|---|---|---|
| 5,738,583 | A * | 4/1998 | Comas et al. | 463/40 |
| 6,354,946 | B1 * | 3/2002 | Finn | 463/40 |
| 6,409,602 | B1 * | 6/2002 | Wiltshire et al. | 463/42 |
| 6,524,189 | B1 * | 2/2003 | Rautila | 463/40 |
| 6,527,641 | B1 * | 3/2003 | Sinclair et al. | 463/39 |
| 6,684,062 | B1 * | 1/2004 | Gosior et al. | 455/73 |
| 6,846,238 | B2 * | 1/2005 | Wells | 463/39 |
| 6,874,029 | B2 * | 3/2005 | Hutcheson et al. | 709/227 |
| 6,908,391 | B2 * | 6/2005 | Gatto et al. | 463/42 |
| 6,947,761 | B2 * | 9/2005 | Hutcheson et al. | 455/518 |
| 7,103,313 | B2 * | 9/2006 | Heinonen et al. | 455/41.2 |
| 7,125,336 | B2 * | 10/2006 | Anttila et al. | 463/40 |
| 7,194,263 | B2 * | 3/2007 | Bahl et al. | 455/432.1 |
| 7,277,408 | B2 * | 10/2007 | Sorsa | 370/328 |
| 7,534,169 | B2 * | 5/2009 | Amaitis et al. | 463/39 |
| 7,565,158 | B1 * | 7/2009 | Aholainen | 455/458 |
| 7,574,493 | B2 * | 8/2009 | Hutcheson et al. | 709/221 |
| 7,627,680 | B2 * | 12/2009 | Hutcheson et al. | 709/228 |
| 7,809,679 | B2 * | 10/2010 | Nixon et al. | 707/609 |

(Continued)

OTHER PUBLICATIONS

PCT International Search Report for PCT Appln No. US2008/055934; mailed Aug. 5, 2008 (2 pages).

(Continued)

*Primary Examiner* — Arthur O. Hall

(57) ABSTRACT

A wireless terminal comprising a transmitter configured to support a wireless connection with a server and a processor configured to enable a user to play an interactive game through the server with a plurality of other users on wireless terminals across a plurality of platforms.

33 Claims, 2 Drawing Sheets

U.S. PATENT DOCUMENTS

| | | | | |
|---|---|---|---|---|
| 2003/0027634 | A1 * | 2/2003 | Matthews, III | 463/39 |
| 2003/0142039 | A1 * | 7/2003 | Minear et al. | 345/2.3 |
| 2006/0063590 | A1 | 3/2006 | Abassi et al. | |
| 2007/0155489 | A1 * | 7/2007 | Beckley et al. | 463/29 |
| 2007/0249420 | A1 * | 10/2007 | Randall | 463/40 |
| 2008/0039203 | A1 * | 2/2008 | Ackley et al. | 463/40 |
| 2008/0096659 | A1 * | 4/2008 | Kreloff et al. | 463/39 |

OTHER PUBLICATIONS

PCT Written Opinion for PCT Appln No. US2008/055934; mailed Aug. 5, 2008 (6 pages).

* cited by examiner

MULTIPLAYER PLATFORM FOR MOBILE APPLICATIONS

The present application for patent claims priority to Provisional Application No. 60/893,618, entitled "Multiplayer Platform for Mobile Applications" filed Mar. 7, 2007, and assigned to the assignee hereof and hereby expressly incorporated by reference herein.

FIELD

The present disclosure relates generally to technology for electronic games, and more particularly, to mobile platforms for supporting interactive electronic game applications on hand-held devices.

BACKGROUND

Electronic games have provided entertainment to a large segment of the population for many years. Originally developed for personal computers (PCs), electronic games are now commonly found on various handheld devices, such as mobile telephones, personal digital assistants (PDAs), game consoles, and the like. The technology supporting these electronic games has increased at a tremendous rate, evolving from simple games presented in a very crude low resolution format to highly sophisticated and complex games with high resolution 3-D graphics.

With the recent development of handheld devices with multimedia capability and Internet access, there exists a tremendous opportunity to introduce new interactive technology into the gaming industry. Multiplayer electronic games, which have traditionally been limited to PC applications, can now be played online by multiple players on multiple handheld devices. However, as this technology continues to evolve, the electronic gaming industry will be confronted with various challenges. These challenges include restricted memory capacity, network latency, limited power, processing limitations, proprietary operating systems, different wireless network protocols, bandwidth considerations, and other challenges generally associated with mobile handheld devices. As the electronic game industry prepares to meet these challenges, there exists a need for new technology that allows multiple players on multiple handsets to play interactive games across multiple platforms.

SUMMARY

One aspect of a wireless terminal is disclosed. The wireless terminal includes a processor configured to enable a user to play an interactive game with a plurality of other users on wireless terminals across a plurality of platforms.

One aspect of a method of wireless gaming is disclosed. The method includes supporting a wireless connection with a server and playing an interactive game on a wireless terminal through the server with a plurality of other users on wireless terminals across a plurality of platforms.

Another aspect of a wireless terminal is disclosed. The wireless terminal includes a means for supporting a wireless connection with a server and a means for enabling a user to play an interactive game through the server with a plurality of other users on wireless terminals across a plurality of platforms.

One aspect of a computer readable medium is disclosed. A computer readable medium embodying a program of instructions executable by a processor in a wireless terminal includes code to interface with a transceiver supporting a wireless connection, with a server and code to enable a user to play an interactive game through a server with a plurality of other users on wireless terminals across a plurality of platforms.

One aspect of a server is disclosed. The server includes a transmitter configured to support a connection with a plurality of wireless terminals and a processor configured to enable a plurality of users to play an interactive game on the wireless terminals across a plurality of platforms.

Another aspect of a server is disclosed. The server includes a means for supporting a wireless connection with a plurality of wireless terminals and a means for enabling a plurality of users to play an interactive game on the wireless terminals across a plurality of platforms.

Another aspect of a computer readable medium is disclosed. A computer readable medium embodying a program of instructions executable by a processor in a server, the instructions include code to interface with a transceiver supporting a wireless connection, with a plurality of wireless terminals, and code to enable a plurality of users to play an interactive game on the wireless terminals across a plurality of platforms.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Figure 1:
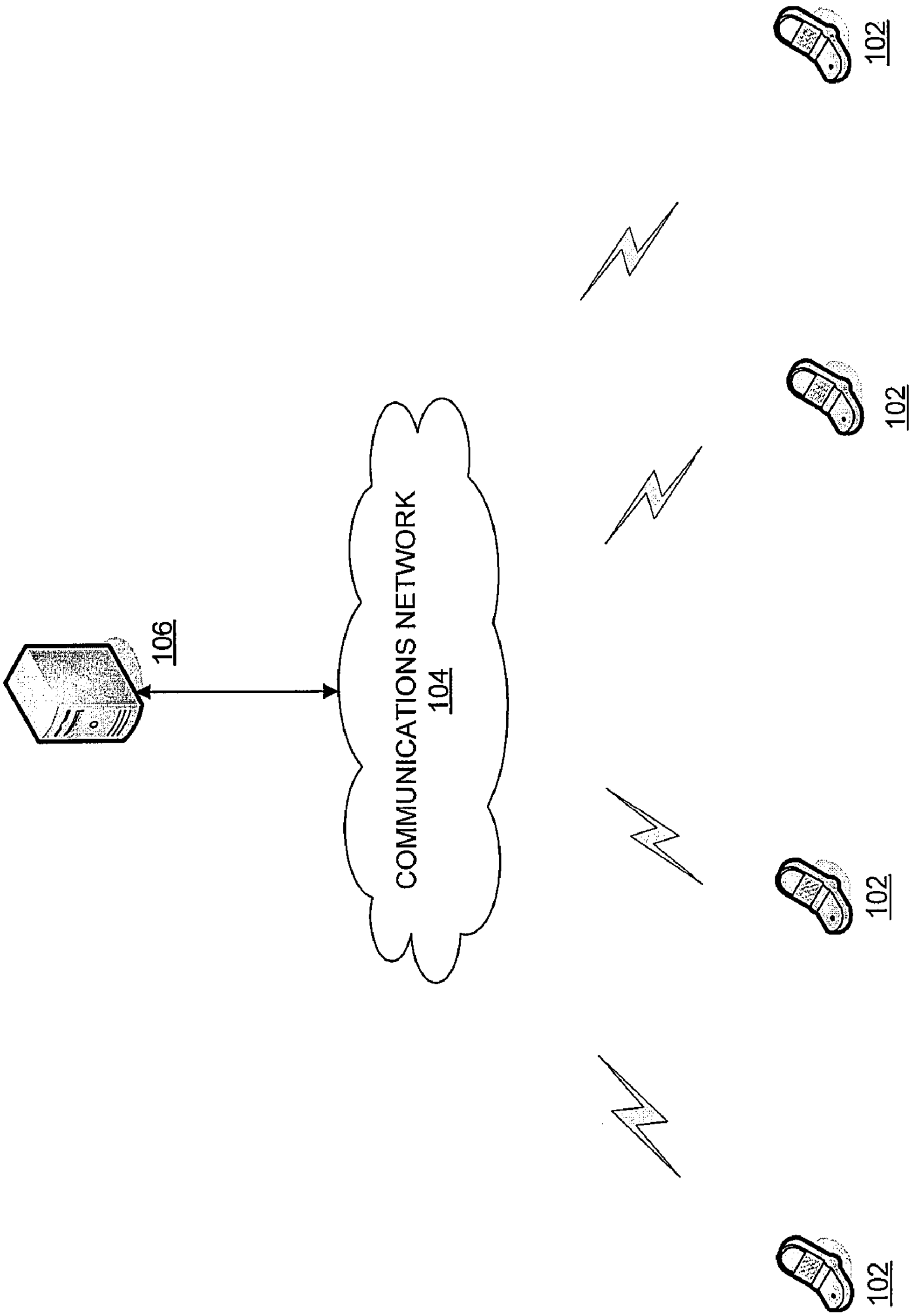
FIG. 1 is a conceptual diagram illustrating an example of a multiple players on multiple handsets playing an interactive game across multiple platforms.

FIG. 1 is a conceptual diagram illustrating an example of multiple players on multiple handsets playing an interactive game across multiple platforms. In this example, a user on a wireless terminal 102 can participate in an interactive game with one or more other users on wireless terminals 102 over a communications network 104. The interactive game may be a client-based or server-based game.

In the client-based game, all playing, ordering, turn management, player dropout, results determination, etc. is handled by the wireless terminals 102 participating in the game—that is, the game events are wireless terminal generated. In one embodiment, there is a master/slave relationship where a single wireless terminal 102 is responsible for game management and broadcasts the corresponding game events to other players. Client-based games are well suited for real-time, or "twitch" style games, where performance is critical but there is not a global game state that must be maintained between players. Client-based games will involve almost exclusive peer communications, since there is no need for the server 106 to process game events.

In server-based games, the server 106 handles all game management tasks and sends the corresponding game events to all wireless terminals 102 participating in the game—that is, the game events are server generated. Server-based games are well suited for turn-based games where latency is not as critical but where turn synchronization between players is important. The server 106 ensures the order in which the players may participate. The server 106 also makes handling player dropouts easier, and makes it easier for wireless terminals 102 to re-synchronize themselves should they fall out of sync with the global game state. Server-based games will typically use a combination of server communications for game management and peer communications for real-time updates.

In the embodiment shown in FIG. 1, the wireless terminal 102 may be any suitable wireless device, including by way of example, a mobile or cellular telephone, a personal digital assistant (PDA), a laptop computer, a game console, or a MP3 player, just to name a few. The wireless terminal 102 may be referred to by those skilled in the art as a client, client terminal, node, handset, portable device, wireless device, wireless station, user terminal, access terminal, user equipment, mobile station, mobile unit, subscriber unit, subscriber station, mobile radio, radio telephone, or some other terminology. The various concepts described throughout this disclosure are intended to apply to all suitable wireless terminals regardless of their configuration and specific nomenclature.

The communications network 104 may include a wide area network (WAN). The largest and most well-known example of a WAN is the Internet. The communications network 104 may also include a number of wireless access networks. By way of example, one or more wireless terminals 102 may connect to a WAN through a cellular network, such as a Code Division Multiple Access (CDMA) network, an Evolution-Data Optimized (EV-DO), a Global system for mobile Communications (GSM) network, General Packet Radio Service (GPRS), Enhanced Data Rates for GMS Evolution (EDGE), or other similar network. Alternatively, or in addition to, one or more wireless terminals 102 may connect to the WAN through a wireless local area network (WLAN), such as such as 802.11, Bluetooth, Ultra-Wide Band (UWB), or the like.

Figure 2:
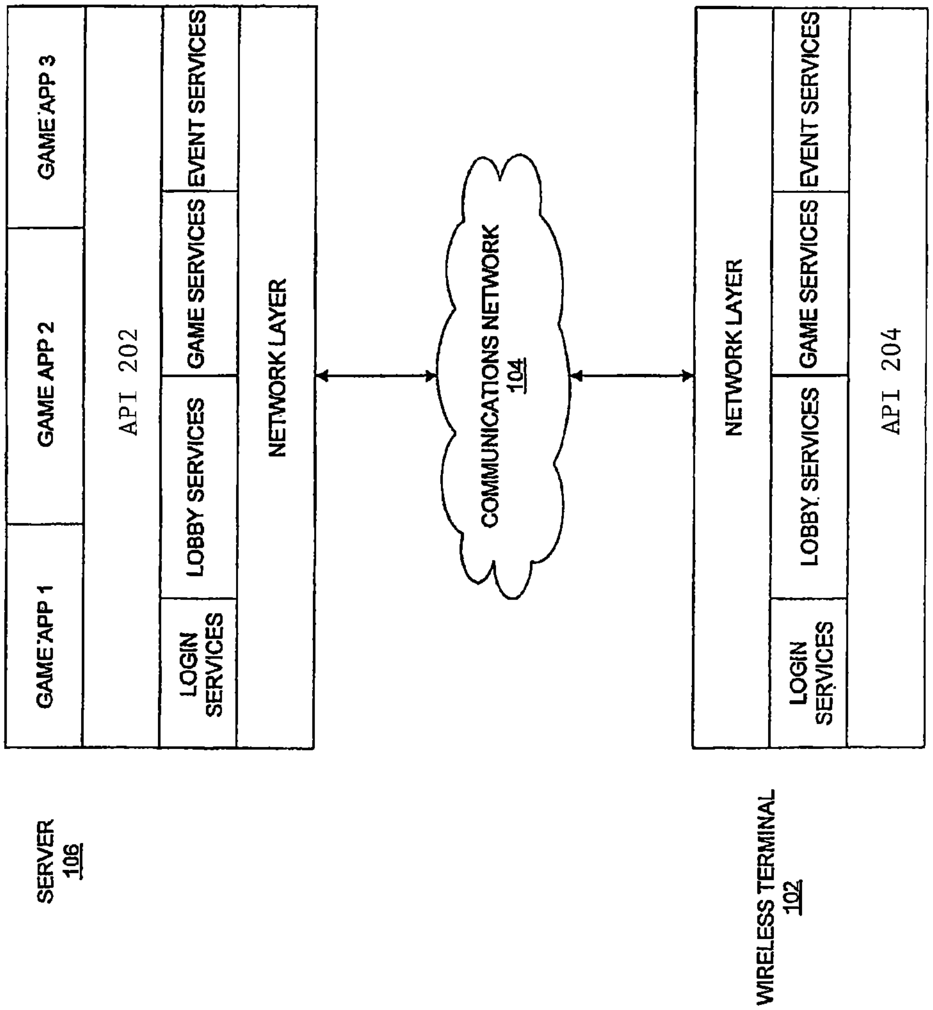
FIG. 2 is a conceptual diagram illustrating an example of the platform for a wireless terminal in communication with a server.

FIG. 2 is a conceptual diagram illustrating an example of the platform for a wireless terminal in communication with a server. The platform in the wireless terminal 102 and the server 106 is supported by a hardware layer (not shown), which together will be referred to as a "processor." In one non-limiting example, the processor may be implemented with a general-purpose or specific-application processor, and may also include computer-readable media with program code or instructions that, when executed, performs some or all of the processor functions described herein. The computer-readable media may be memory or a hierarchy of memories including general register files, caches, volatile memory, and/or non-volatile memory. The program code or instructions may also be stored on computer-readable media external to the processor including any medium that is used to transfer program code or instructions to the processor. By way of example, computer-readable media includes a connection to the processor from a website, server, or other remote source, or a carrier wave that encodes data.

A general-purpose processor may be a microprocessor. A specific-application processor may be an embedded processor, a digital signal processor (DSP), an application specific integrated circuit (ASIC), a controller, a microcontroller, a state machine, a field programmable gate array (FPGA) or other programmable logic component, discrete gate or transistor logic, or discrete hardware components. The processor may also be implemented as a combination of processing entities (e.g., a combination of a DSP and a microprocessor, a plurality of microprocessors, one or more microprocessors in conjunction with a DSP core, or any other such configuration).

In this example, the platform provides login/authentication, lobby, game, and event services common to one or more multiplayer games. The primary component of the platform is the Application Program Interface (API) on both the wireless terminal 102 and the server 106. On the server 106 side, the API 202 allows developers to access game server functionality from within their own virtual game server. Multiple game applications can run on the same physical server. The API 204 on the wireless terminal 102 side provides an interface to the server 106 and supports various application environments, including by way of example, Binary Runtime Environment for Wireless (BREW), Java Platform, Micro Edition (J2ME), and Java Platform, Standard Edition (J2SE/Web).

In one embodiment, server API 202 is designed to allow multiple game applications to run simultaneously on the same server instance. Each game application has its own virtual server within the server 106. Though multiple game applications may be running simultaneously, each virtual game server will behave entirely like a dedicated server for an application. The virtual game server will be running in its own Java Virtual Machine (Java VM), on its own networking port, and without affecting other applications running on the server 106.

As part of the configuration process, the virtual game server for each application will be assigned a set of unique identifiers to distinguish it from other game applications running on the server 106. By way of example, a unique text label may be used to identify each game application. This label may be used in directory paths, in file names, and in API methods. Another example is a Transmission Control Protocol (TCP) identifier. In at least one embodiment of the server 106, each virtual game server may be assigned its own, unique port number.

The virtual game server for each application provides File Transfer Protocol (FTP), and possibly Secure Shell SSH, access to the file system. The file system may include a number of directories, including a directory for installing application specific binary files, a directory to log application specific events, and a directory for application specific property files.

All wireless terminal 102 interaction with the platform occurs via the API 204. This API 204 handles all of the underlying networking communications between the game application running in the wireless terminal 102 and the virtual game server. There is a separate version of the API 204 provided for each supported category of wireless terminal 102 (e.g., J2ME, BREW, and J2SE). Aside from any software language differences, each version of the API 204 is nearly identical. This significantly simplifies porting of the game applications. The game application may be created just like it would for any other J2ME or BREW application that uses a third party library. No changes are required to the J2ME MIDlet or BREW Applet.

The game application on the wireless terminal 102 creates a network engine when the application is launched and terminates the network engine when it is shutdown. The network engine is responsible for maintaining all of the underlying API 204 services on the wireless terminal 102. Once the Network engine has been created, the API 204 services can be accessed. The services are organized into four general categories: login services 206, lobby services 208, game services 210, and event services 212. The login services 206 handles all user login and authentication functionality, including guest login, pre-registered login, new account creation, and logout. The lobby services 208 handles all lobby and room functionality, including entering and leaving lobbies, creating and closing rooms, searching for and listing rooms, joining and leaving rooms, and searching for and listing users. The games services 210 handles game life cycle functionality, including starting and ending games. The event services 212 handles all application specific sending and receiving of network events, including sending and receiving server events, and sending and receiving peer events.

The server 106 provides login services 206 that handles login, authentication, and logout functionality for the applications. There are three ways for the wireless terminal 102 to log in to the virtual game server. A client can login as a guest, which requires no username or password authentication. Guest users are for the most part equivalent to registered users within a lobby. However, guest users do not have a user profile and do not persist score or ranking data. A wireless terminal 102 with an existing user account can login given their user name and password. User names are unique across all applications running on the server 106. Registered users maintain a user profile and are eligible to have score and ranking data persisted. New account registration requires a user to specify a username and password, and other optional information. If account creation is successful, the user will automatically be logged into the server 106 using the new account. Authentication automatically takes places as part of the login process. Once online, a user is eligible to participate in lobby services.

The server 104 platform additionally provides for lobby services 208 API which handles all functionality related to matching users together so that they may participate in a game. The lobby services 208 are a powerful feature set flexible enough to accommodate most game designs. The lobby services 208 API relies heavily on key sets that are used to define the attributes of rooms and users within a lobby.

A concept used throughout the Lobby services 208 API is the key set. A key set is a set of key-value properties used to define various components of the API services. A key set contains a series of keys, each of which has meta-data and a runtime value. Some keys are base keys defined by the server 106 and are shared by all game applications. Other keys are application specific keys that can be defined for any particular application. Typically, a key set is passed as a parameter to an API method after setting a value for one or more individual keys.

All keys have meta-data, which is the data describing the key itself. Key meta-data is constant for all instances of a key. This allows keys to be copied without having to copy the meta-data each time, and allows keys to be efficiently sent across the communications network. All key meta-data is read-only. Key meta-data is defined in a server-side XML file. Examples of key meta-data fields include Key type (num, text, bool, or enum), Key name (unique within a key set), Optional default value, Optional fixed value (making the key value read-only), Optional min/max range (num type only), Enumeration labels.

In addition to meta-data, each instance of a key can have a runtime value. This is the actual value that you set for the key while your application is running. Validation of key runtime values and transmission of runtime values across the communications network is automatically handled by the API services. On both the server side and the wireless terminal side, the keys may be accessed and the run-time values set or modified.

The most common type of key set used by lobby services 208 API is the room key set. A room key set defines the allowable set of keys used to describe the attributes of a room within a lobby. Room attributes may include: room name, maximum users allowed, whether or not users can join after a game has begun, etc. Room key sets are used in the following ways: 1) to set the properties for a room when the room is created; 2) to define search criteria when searching for rooms; and/or 3) to define auto-match criteria when joining rooms.

Room keys have both base keys and application specific keys. The base keys are defined internally by the server 106 and are inherited by all room key sets. Most applications will need room attributes specific to the particular application. For example, in a Poker game scenario, you might have application specific room keys such as: game type, blind, minimum ante, etc. These keys are defined in a file located on the virtual game server and may comprise an XML format. Multiple room key sets in the XML file are definable.

In addition to room key sets, the lobby services 208 API also makes use of a user key set. A user key set defines the allowable set of keys used to describe the profile of a user. A user profile might include: unique user name, gender, age, rank, etc. Rather than creating custom keys, one may use a user key set to map keys to fields read from an external data source. In this way, the user key set can be used as a container in which to aggregate data from multiple data sources. This aggregated data represents the user profile for a user. Each time that a user enters a lobby, the server 106 will create a user profile for the corresponding user by reading all the fields defined in the user key set. The underlying data source is only queried once for each user session. The resulting user profile is available both client-side and server-side via an API method. Internally, the server 106 accesses the external data sources via JE modules. All JE modules data fields are created using external tools. User profile keys are mapped to external data source fields via a user key set. The Server 106 will query all available JE module data sources to find a match for each defined key.

The lobby services 208 API is based around the concept of rooms. Users are matched together into a room from which a game can be started. Games may be run from within a room. The rooms themselves are grouped into lobbies. Multiple lobbies can be defined for each application running on the server 106. Each application has a single lobby by default. One may then create their own application specific lobbies to suit their needs. All lobbies have a unique text name used to identify the lobby within API methods. Each lobby points to a room key set definition that defines the set of room keys, and their default value, that will be used for all room creation and room searching within the lobby. Each lobby also points to a user key set definition that defines the set of user keys, and their default values, that will be used for all user profiles and user searching with the lobby. It may be a signification performance advantage to separate the users into multiple lobbies as evenly as possible—by skill level, by carrier, by game functionality, etc. Once created, a user may enter, leave, or even create lobbies and rooms to facilitate their needs.

A user on a wireless terminal 102 may search for a specific room, or rooms, within a lobby using a search method. The user specifies attributes and search criteria for determining which rooms or users are returned in the search results. If it is anticipated that the search result may return a large number of users or rooms, one can control the size of the returned list by specifying a predetermined range. Optionally, one can also restrict the search results to only include rooms that are currently joinable, e.g. if not full, and users matching their entered criteria. Also, one can list all rooms in a lobby, such list also being controllable by limiting to a range. Once an appropriate room is found and available, one has the ability to join the room, search again, leave other rooms, etc.

The game services 210 are primarily responsible for managing the life cycle of games running on the virtual game server. A game may be started from an existing lobby room and may run from within that room. Games may never exist outside of a lobby room and for this reason, the game services 210 and lobby services 208 are tied closely together. Every time a game is started from a lobby room, the server 106 will dynamically create a new instance of a game class. If the application needs to perform custom server-side functionality, then one may need to create their own game plugin class. A game can start either client-side or server-side via an API method. In some instances, one may want to have a game automatically begin from a room as soon as a certain number of players have joined the room. One is able to accomplish this by setting system defined attributes as 'true.'

The event services 212 provide the ability to send and receive application specific event in the game. These events can be used for any purpose desired, but typically will include: game moves, score reporting, player turn management, user chat, etc. There are two types of events used for application specific communication: peer events and server events. A peer event is a peer-to-peer event sent directly between clients—that is, a wholly independent wireless terminal network event. There is no server-side processing of this type of event. If a true peer-to-peer protocol is not available on the wireless terminal 102, the event will be forward via the server 106. Peer events are typically used for real-time events such as cursor movement, sprite position updates, etc. and can be sent via unicast, multicast, or broadcast. A server event is a client-server event sent between the wireless terminal 102 and the virtual game server—that is, a server network event. The virtual game server will have the opportunity to process the event and perform whatever application specific functionality required. Server events are typically used for global state management and synchronization between clients and can be sent anytime during the wireless terminal's 102 login session.

Since the MultiPlayer Platform is protocol agnostic, one skilled in the art can appreciate that any application that interfaces with the server 106 or wireless terminal 102 network layer can take advantage of the various concepts disclosed herein, i.e., real-time gaming, without having to make any modifications if already configured to communicate over standard HTTP via TCP or any other protocol. The concept that allows for real-time gaming over standard HTTP, however, will be specifically referred to herein as "real-time HTTP" or "RT-HTTP." The multiple game applications within the wireless terminal 102 and the server 106 indicate the independence of RT-HTTP as compared to application interaction due to the server 106 or wireless terminal 102 API. The server 106 API and wireless terminal 102 API are source code interfaces that the nodes provide in order to support requests for services (e.g., real time communications) by individual game apps.

Although an RT-HTTP object may be conceptually depicted in the transport layer, alongside TCP and UDP, one skilled in the art would recognize that this logical representation is for ease of interpreting how RT-HTTP provides real time communications. True HTTP is an application layer protocol subject to all the limitations of a half-duplex communications protocol, but due to the novel implementation of RT-HTTP, it is more accurately described as a transport layer "protocol."

Further, a wireless terminal 102 and the server node 104 possess a network layer that interfaces with a communications network 104. The network layer simply facilitates communication between the nodes but is not dependent on a particular communication protocol, e.g. TCP, UDP, etc. Thus, no modification of a pre-existing network layer is necessary in order to implement RT-HTTP. Accordingly, in order for the server 106 and the wireless terminal 102 to communicate over the communications network 104, both the server 106 and the wireless terminal 102 simply need to be configured with an RT-HTTP component that operates just above the network layer, but otherwise looks transparent to layers above and below the RT-HTTP component. This communications layout allows for the "real-time" interaction between many wireless terminals 102 over a protocol that traditionally has limited such communication from taking place. Additional details relating to the implementation of RT-HTTP is found in pending U.S. patent application Ser. No. 11/679,051, titled System and Method for Real-Time Communications over HTTP, which is hereby incorporated by reference as though it has been fully set forth herein.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A wireless terminal, comprising:

a transmitter configured to support a wireless connection with a server, wherein the server includes a plurality of virtual game servers each individually dedicated to a different specific platform; and a processor configured to operate on a first platform, the processor including an Application Program Interface that handles all communication between an application running on the wireless terminal and a specific platform of the server, and wherein launch of the application running on the wireless terminal creates a network engine on the wireless terminal operative to allow and maintain access to all services performed by the Application Program Interface on the wireless terminal, and shutdown of the application running on the wireless terminal terminates the network engine, and wherein the services performed by the Application Program Interface include a service to enable a user to play an interactive game through the server with a plurality of other users on wireless terminals across a plurality of platforms, and to communicate with a first virtual game server of the plurality of virtual game servers, the first virtual game server dedicated to the first platform.

2. The wireless terminal of claim 1 wherein the processor is further configured to provide login services that enable the user to self-identify and authenticate the wireless terminal.

3. The wireless terminal of claim 1 wherein the processor is further configured to provide lobby services, wherein the lobby services comprise at least one lobby having one or more keysets associated therewith.

4. The wireless terminal of claim 3 wherein lobby services include functions to provide a user's ability to enter, join, leave, create, close, or search for lobbies matching certain specified criteria.

5. The wireless terminal of claim 3 wherein the keysets associated with a lobby further comprises metadata and a runtime value, wherein the metadata is defined in XML format.

6. The wireless terminal of claim 1 wherein the processor is further configured to provide game services that manages wireless terminal generated and server generated game events to administer game lifecycle functionality.

7. The wireless terminal of claim 1 wherein the processor is further configured to provide event services to manage network events, wherein the network events comprises server network events and wireless terminal network events.

8. The wireless terminal of claim 1 wherein the processor is further configured to interact with the other users on wireless terminals in real-time via HTTP.

9. A method of wireless gaming, comprising:

supporting a wireless connection with a server, wherein the server includes a plurality of virtual game servers each individually dedicated to a different specific platform;

playing an interactive game on a wireless terminal, operating on a first platform, through the server with a plurality of other users on wireless terminals across a plurality of platforms wherein launch of the game running on the wireless terminal creates a network engine on the wireless terminal operative to allow and maintain access to all services performed by an Application Program Interface included on said wireless terminal, said Application Program Interface handling all communications across said wireless connection from said wireless terminal to said server, and shutdown of the game running on the wireless terminal terminates the network engine; and communicating with a first virtual game server of the plurality of virtual game servers, the first virtual game server dedicated to the first platform.

10. The method of claim 9 further comprising providing login services that enable the user to self-identify and authenticate the wireless terminal.

11. The method of claim 9 further comprising providing lobby services that facilitate the user's ability to enter, join, leave, create, close, or search for lobbies matching certain specified criteria, wherein the step of providing the lobby services comprise at least one lobby and associating one or more keysets therewith.

12. The method of claim 9 further comprising providing game services that manages wireless terminal generated and server generated game events to administer game lifecycle functionality.

13. The method of claim 9 further comprising providing event services to manage network events, wherein the network events comprises server network events and wireless terminal network events.

14. The method of claim 9 wherein further comprising enabling the users to communicate in real-time via HTTP with the other users on wireless terminals to play the interactive game.

15. A non-transitory computer readable medium embodying a program of instructions executable by a processor in a wireless terminal, the instructions comprising:

code to interface with a transceiver supporting a wireless connection, with a server, wherein the server includes a plurality of virtual game servers each individually dedicated to a different specific platform;

code to enable a user to play an interactive game, operating on a first platform, through a server with a plurality of other users on wireless terminals across a plurality of platforms wherein launch of the interactive game running on the wireless terminal creates a network engine on the wireless terminal operative to allow and maintain access to all services performed by an Application Program Interface included on said wireless terminal, said Application Program Interface handling all communications across said wireless connection from said wireless terminal to said server, and shutdown of the interactive game running on the wireless terminal terminates the network engine; and code to communicate with a first virtual game server of the plurality of virtual game servers, the first virtual game server dedicated to the first platform.

16. The computer readable medium of claim 15 further comprising code to provide login services that enable the user to self-identify and authenticate the wireless terminal.

17. The computer readable medium of claim 15 further comprising code to provide lobby services that facilitate the user's ability to enter, join, leave, create, close, or search for lobbies matching certain specified criteria, wherein the lobby services comprise at least one lobby having one or more keysets associated therewith.

18. The computer readable medium of claim 15 further comprising code to provide game services that manages wireless terminal generated and server generated game events to administer game lifecycle functionality.

19. The computer readable medium of claim 15 further comprising code to provide event services to manage network events, wherein the network events comprises server network events and wireless terminal network events.

20. The computer readable medium of claim 15 further comprising code to interact with the other users on wireless terminals in real-time via HTTP.

21. A server, comprising:

a transmitter configured to support a connection with a plurality of wireless terminals; and a processor configured to enable a plurality of users to play an interactive game on the wireless terminals across a plurality of platforms wherein launch of the interactive game running on a wireless terminal creates a network engine on the wireless terminal operative to allow and maintain access to all services performed by an Application Program Interface included on said wireless terminal, said Application Program Interface handling all communications across said connection with a plurality of wireless terminals, and shutdown of the game running on the wireless terminal terminates the network engine.

22. The server of claim 21 wherein the processor is further configured to provide login services that enable the plurality of users to each self-identify and authenticate the wireless terminals.

23. The server of claim 21 wherein the processor is further configured to provide lobby services that facilitate the plurality of users' ability to enter, join, leave, create, close, or search for lobbies matching certain specified criteria, wherein the lobby services comprise at least one lobby having one or more keysets associated therewith.

24. The server of claim 23 wherein the keysets associated with a lobby further comprises metadata and a runtime value, wherein the metadata is defined in XML format.

25. The server of claim 21 wherein the processor is further configured to provide game services that manages the wireless terminal generated and server generated game events to administer game lifecycle functionality.

26. The server of claim 21 wherein the processor is further configured to provide event services to manage network events, wherein the network events comprise server network events and wireless terminal network events.

27. The server of claim 21 wherein the processor is further configured to interact with the plurality of users on the wireless terminals in real-time via HTTP.

28. A non-transitory computer readable medium embodying a program of instructions executable by a processor in a server, the instructions comprising:

code to interface with a transceiver supporting a wireless connection, with a plurality of wireless terminals; and code to enable a plurality of users to play an interactive game on the wireless terminals across a plurality of platforms wherein launch of the interactive game running on a wireless terminal creates a network engine on the wireless terminal operative to allow and maintain access to all services performed by an Application Program Interface included on said wireless terminal, said Application Program Interface handling all communications across said wireless connection with a plurality of wireless terminals, and shutdown of the interactive game running on the wireless terminal terminates the network engine, wherein the server includes a plurality of virtual game servers each dedicated to a platform of the plurality of platforms.

29. The computer readable medium of claim 28 further comprising code to provide login services that enable the plurality of users to each self-identify and authenticate the wireless terminals.

30. The computer readable medium of claim 28 further comprising code to provide lobby services that facilitate the plurality of users' ability to enter, join, leave, create, close, or search for lobbies matching certain specified criteria, wherein the lobby services comprise at least one lobby having one or more keysets associated therewith.

31. The computer readable medium of claim 28 further comprising code to provide game services that manage the wireless terminal generated and server generated game events to administer game lifecycle functionality.

32. The computer readable medium of claim 28 further comprising code to provide event services to manage network events, wherein the network events comprise server network events and wireless terminal network events.

33. The computer readable medium of claim 28 further comprising code to interact with the plurality of users on the wireless terminals in real-time via HTTP.

* * * * *